United States Patent [19]

Schenck

[11] 4,365,927

[45] Dec. 28, 1982

[54] SLASH RECOVERY SYSTEM

[76] Inventor: Ray B. Schenck, Box 94, Grays River, Wash. 98621

[21] Appl. No.: 146,376

[22] Filed: May 2, 1980

[51] Int. Cl.³ .................... B66D 3/00; B66C 21/02
[52] U.S. Cl. ............................ 414/729; 414/739; 414/694; 180/41; 254/327; 104/183
[58] Field of Search .............. 241/107.5; 254/326, 254/327, 323; 414/694, 685, 718, 734, 739, 729; 104/183, 175 R

[56] References Cited

U.S. PATENT DOCUMENTS

| | | |
|---|---|---|
| 1,280,951 | 10/1918 | Blackmarr . |
| 3,049,186 | 8/1962 | Garrett . |
| 3,077,338 | 2/1963 | Bergerson et al. ............. 254/327 X |
| 3,319,936 | 5/1967 | Askins ........................... 254/327 X |
| 3,398,967 | 8/1968 | Brocklebank et al. |
| 3,850,304 | 11/1974 | Howell . |
| 4,238,116 | 12/1980 | Plante ............................ 254/327 X |

FOREIGN PATENT DOCUMENTS

| | | |
|---|---|---|
| 1308918 | 3/1973 | United Kingdom ............... 104/183 |
| 502625 | 4/1976 | U.S.S.R. ........................... 414/734 |
| 616177 | 6/1978 | U.S.S.R. ........................... 104/173 R |

Primary Examiner—Robert J. Spar
Assistant Examiner—Terrance L. Siemens
Attorney, Agent, or Firm—Klarquist, Sparkman, Campbell, Leigh, Whinston & Dellett

[57] ABSTRACT

A vehicle for removing slash from steep logging slopes includes an anti-skid propulsion system characterized by a power winch for reeling in an uphill-anchored cable and a pair of crawler tracks (or large tires) driven in synchronization with the winch. The vehicle has an articulating tail boom for working against the cable to assist in maneuvering the vehicle along the slope and stabilizing the vehicle during slash gathering operations. A knuckle boom which is extendable from the vehicle has a grapple for gathering slash within a relatively large area around the vehicle. Removal of slash from the operating site of the vehicle is accomplished by transporting the slash to an access landing using a mobile slash wagon or by chipping the slash using a chipper mounted on the vehicle and then pneumatically carrying the chips through a pipe to a storage van at an access landing remote from the vehicle.

5 Claims, 4 Drawing Figures

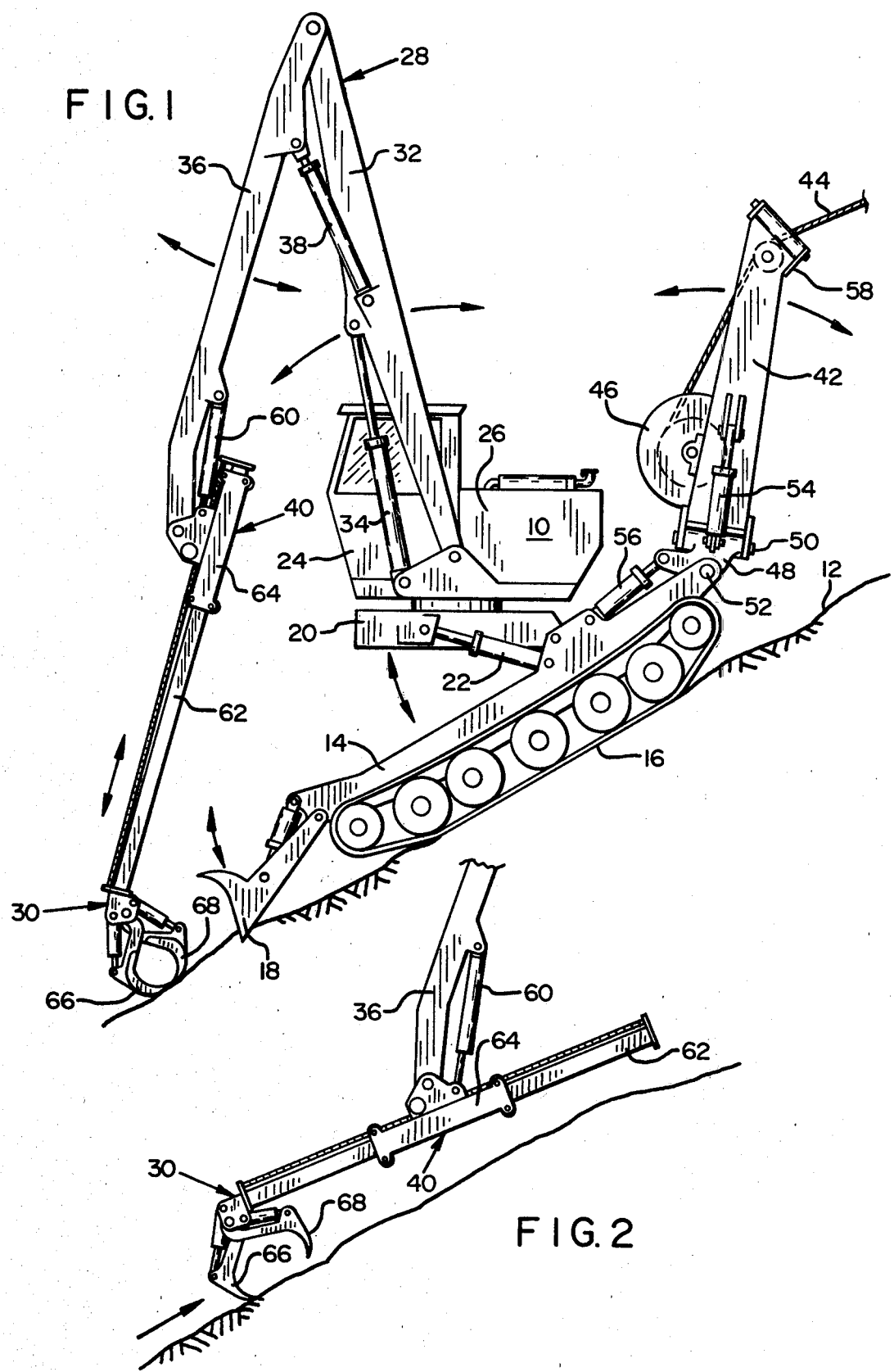

SLASH RECOVERY SYSTEM

The present invention pertains to vehicles and methods for gathering and removing slash from a logging slope.

Heretofore it has been common practice in the art to burn slash after a logging operation particularly on steep, rugged logging slopes from which slash removal is more difficult and consequently more expensive. The rising cost of energy in recent years has made slash recovery economically attractive under appropriate conditions. It has just recently become common practice on gentle accessible slopes to gather and use logging slash for composition board, pulp and paper, and energy. It is becoming increasingly profitable to use slash as firewood or in other energy related applications. The present invention permits more efficient removal of slash so that even rugged, steep logging slopes can be exploited economically.

It will be appreciated that it is desirable to achieve reforestation in the shortest possible time. Such an objective demands that any slash removal operation be performed with a minimum of disruption to the forest soil. Prior art practices have often lead to serious soil erosion so as to unnecessarily add decades to the reforestation cycle. The present invention enables slash removal with a minimum of damage to the forest mantle and assists in preparing the site for reforestation.

In accordance with the present invention, a slash recovery system includes a slash gathering vehicle which is movable up and down a steep logging slope by winching on a cable with assistance from hydrostatically powered drive tracks or wheels which are operable in synchronization with the winching action to substantially eliminate spinning and skidding of the vehicle on the forest soil.

Several preferred ways of practicing the invention will now be described with reference to the accompanying drawings, in which:

FIG. 1 is a side elevational view of a slash gathering vehicle in accordance with the present invention;

FIG. 2 is a side elevational view of a grapple portion of the vehicle in FIG. 1 shown in a different position;

Figure 3:
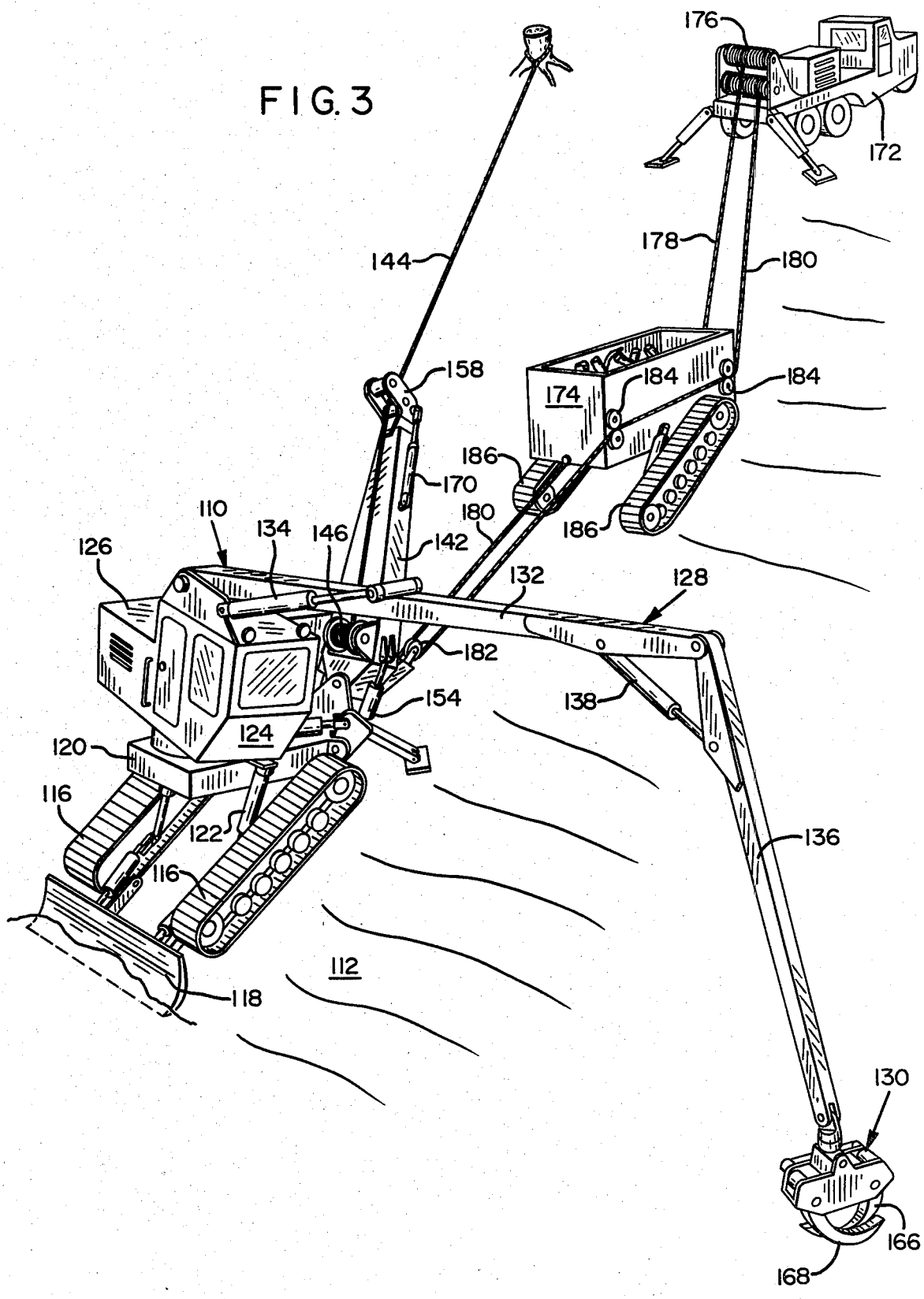
FIG. 3 is a pictorial representation of a slash removal system in accordance with the present invention.

Referring to FIGS. 1 and 2, a first embodiment of the invention will now be described. FIG. 1 illustrates a vehicle 10 for gathering slash from a steep logging slope 12. The vehicle 10 is motivated on a crawler-type lower chassis 14 having a low ground pressure track 16 on each side and a conventional front dozer blade 18. Each of the two side tracks 16 (only the left track being visible in FIG. 1) is powered independently by conventional hydrostatic drive means. The lower chassis 14 carries an upper chassis 20 which is equipped with a leveling system including hydraulic cylinders 22 for maintaining an operator's cabin 24 in a horizontal or other suitable attitude. A prime mover housing 26 is disposed on the upper chassis 20 rearward from the operator's cabin 24 and is equipped with a diesel engine and hydraulic pumps for controllably powering the vehicle's various systems. A knuckle boom 28, which is mounted on the upper chassis 20 adjacent to the cabin 24, has a hydraulically actuated grapple 30 at its remote end. The knuckle boom 28 comprises an upper arm 32 pivotally secured to the chassis 20 and actuated by a hydraulic cylinder 34, a forearm 36 pivotally secured to the remote end of the upper arm 32 and actuated by a hydraulic cylinder 38, and a rack-and-pinion driven slide mechanism 40 carried by the remote end of the forearm 36.

In accordance with an important feature of the invention, a tail boom 42 is mounted on the rearward end of the lower chassis 14 for working a propulsion or anchor cable 44 which is secured uphill to a suitable support such as a tree stump (not shown). The tail boom 42 carries a hydrostatically powered winch 46 for reeling in or letting out the cable 44 under the control of the operator in the cabin 24. Interconnecting the tail boom 42 and the chassis 14 is a universal joint 48 providing first and second pivotal axes 50 and 52 for lateral and longitudinal articulation of the tail boom 42 under the control of push-pull hydraulic cylinders 54 and 56. A fairlead 58 having crossed cylindrical rollers is provided on the remote end of the tail boom 42 for guiding the cable 44 onto the winch 46. When the knuckle boom 28 is extended to reach to one side, the tail boom 42 can be used to stabilize the vehicle 10 by interaction with the cable 44 while under tension. With the tail boom 42 in a near vertical position, the vehicle 10 can safely move laterally across the slope motivated by the tracks 16 and stabilized by the tension on the cable 44.

In an alternative arrangement contemplated by the invention, the propulsion winch 46 can be eliminated from the vehicle 10 and provided instead on an apparatus (not shown) located at an uphill point, in which case the cable 44 would be secured to a point of the base of the tail boom 42. As a further alternative, an additional winch (not shown) can be provided at an uphill point for selectively operating independently of or in tandem with the vehicle-mounted winch 46.

Referring to FIG. 2, the slide mechanism 40 is shown in a raking position oriented parallel to the ground contour by means of a tilt cylinder 60. The slide mechanism 40 comprises an elongated bar 62 slidably disposed in a casing 64 which is pivotally supported at the remote end of the forearm 36. The knuckle boom 28 equipped with the slide mechanism 40 is capable of performing a number of different operations. When oriented in the position shown in FIG. 2, a front claw 66 of the grapple 30 can be used effectively as a scarifying rake. During raking, a rear claw 68 serves to guide and control the depth of penetration of the front claw 66 into the soil. A chain saw (not shown) can be employed on the remote end of the knuckle boom 28 to cut slash into suitable lengths for transporting by the grapple 30.

In operation, the vehicle 10 moves down the slope 12 to the bottom and then works its way back up in stages. The dozer blade 18 is used to anchor the vehicle 10 in setting up at each stage, thereby also forming a "water bar" in the slope 12 as a consequence of setting up. The knuckle boom 28 is preferably capable of reaching 50 feet to each side and is used to rake the slope transversely to the fall line in order to create "erosion barriers" across the slope. It will, therefore, be appreciated that the vehicle 10 is capable of removing slash from a hundred foot wide swath while also preparing the slope 12 for reforestation in progressive setups while working its way back up the slope. The vehicle 10 is also capable of bulldozing corridors through young forests that have not been previously logged.

A second embodiment of the invention will now be described with reference to FIG. 3 in which a system for slash removal is depicted. The system employs a slash gathering vehicle 110 which is similar in many respects to the previously described vehicle 10 of FIG. 1. Accordingly, rather than providing a repetitious description, similar numerals will be employed to reference similar parts. One readily apparent difference is that the vehicle 110 employs a more conventional knuckle boom 128 with a hydraulically actuated grapple 130 connected directly to the forearm 136. Another difference is that the knuckle boom 128 is mounted above the operator's cabin 124 instead of to the side An additional feature is the provision of a fairlead 158 which can be pivoted laterally upon the end of the tail boom 142 by means of a push-pull hydraulic cylinder 170. By selectively pivoting the fairlead 158, the operator can spool the cable 144 properly onto the winch 146.

In addition to the vehicle 110, the system of FIG. 3 includes a line truck 172 anchored at an uphill point and a large capacity slash wagon 174 employed between the vehicle 110 and the line truck 172 within reach of the knuckle boom 128. The truck 172 includes a rearwardly mounted double-drum hoist 176 adapted to raise and lower the slash wagon 174 by means of a main cable 178 and a haulback cable 180. The main cable 178 is attached to the upper end of the wagon 174. The haulback cable 180 is attached to the lower end of the wagon 174 and is looped around a pulley 182 on the uphill end of the vehicle 110 and threaded through guide rollers 184 on the side of the wagon 174. The slash wagon 174 includes hydrostatically driven crawler tracks 186 for assisting the cables 178 and 180 in propulsion of the wagon 174.

The system of FIG. 3 operates as follows. After the slope 112 has been logged, the vehicle 110 moves down the slope by gradually letting out the cable 144 while the tracks 116 crawl forward, which can be accomplished with a minimum of soil disturbance. The slash wagon 174 follows relatively closely behind the vehicle 110 under the control of the double-drum hoist 176 which lets out cables 178 and 180 at about the same rate that the winch 146 lets out the cable 144. The vehicle 110 travels to the bottom of the slope, which can be 1500 feet or more down slope from the line truck 172, and then sets up for its first operation by anchoring the dozer blade 118 in the soil as shown. The knuckle boom 128 is then used to gather the slash within reach on each side of the vehicle 110 and deposits the slash in the wagon 174. Prior to slash removal, it might be necessary to cut the slash into manageable lengths using a chain saw as mentioned above. When all the slash within reach has been cleared and collected, the vehicle 110 and the wagon 174 move uphill and set up at the next location. Soil disturbance is again minimized by reeling in the cables 144 and 178 while assisting with the drive tracks 116 and 186. The slash wagon 174 is steered and controlled by "tightlining" the main cable 178 and haulback cable 180 in accordance with known techniques. When the slash wagon 174 becomes full with slash, it is moved uphill to a landing by reeling in cable 178 while letting out cable 180. The wagon 174 then dumps itself by hydraulic means (not shown) and is returned to the vicinity of the vehicle 110 by letting out the cable 178 while reeling in cable 180. Each of these movements is, of course, assisted by the drive tracks 186. The slash removal operation then continues in the same manner until the vehicle 110 has cleaned its way back up the slope 112. At each stage of the slash removal operation, it is preferable that "erosion barriers" be formed by horizontal raking using the claws of the grapple 130. Thus, the forest slope can be prepared for immediate planting.

In an alternate system, the haulback cable 180 can be eliminated and the slash wagon 174 operated independently of the gathering vehicle under the control of a separate operator, in which case the slash wagon 174 would be hoisted uphill by the cable 178 with assistance from the drive tracks 186 and then lowered and steered downhill by the tracks 186 with stablilizing support from the cable 178. As a further alternative, a winch (not shown) can be provided on the slash wagon for reeling in the cable 178 which would then only need to be anchored to a suitable uphill support.

Figure 4:
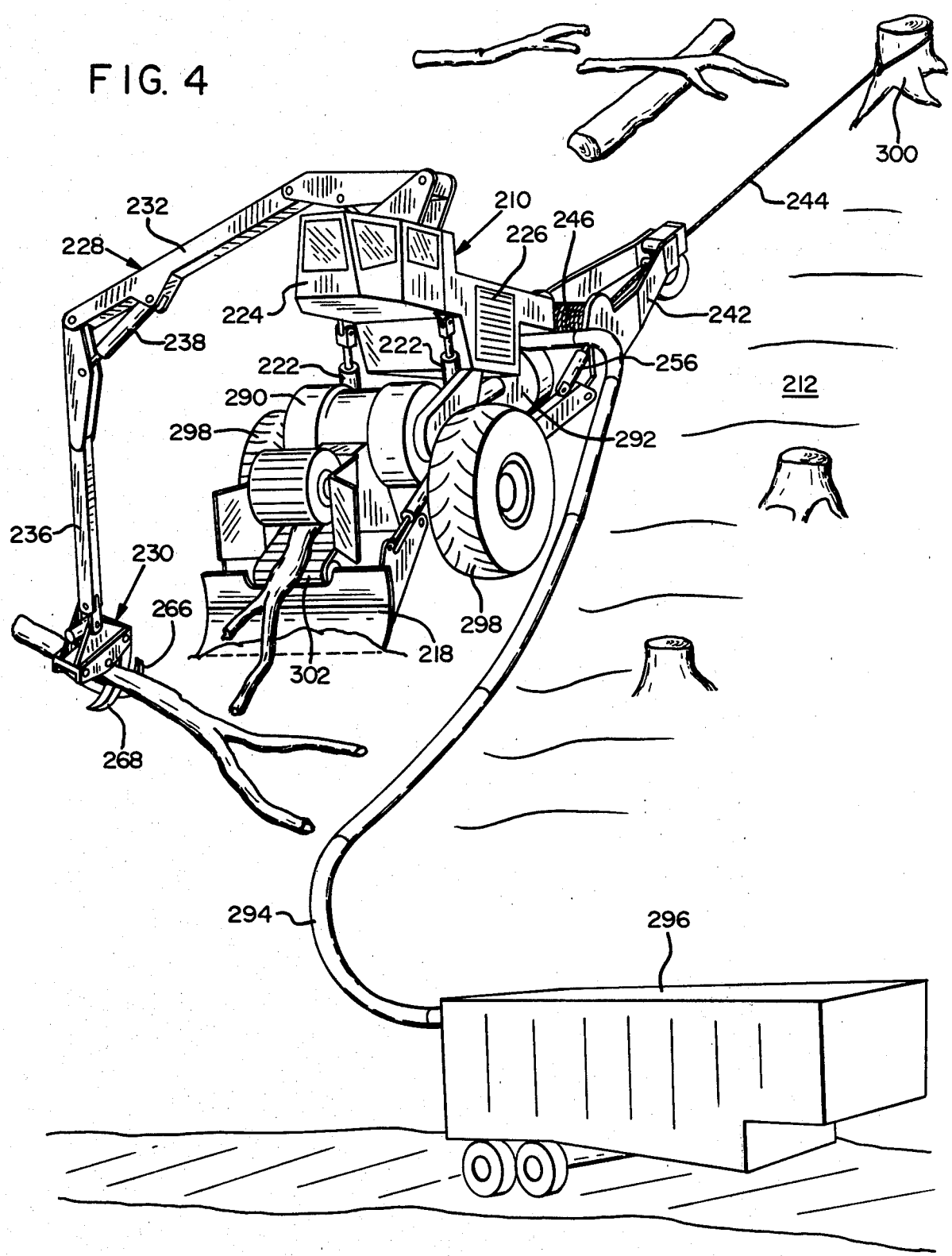
FIG. 4 is a pictorial representation of another slash removal system in accordance with the present invention.

A third embodiment of the invention will now be described with reference to FIG. 4 in which a system for gathering and chipping slash is depicted. The system employs a slash gathering vehicle 210 which is similar in certain respects to the previously described vehicles 10 and 110, similar numerals referencing similar parts. The vehicle 210 differs most significantly in that it is equipped with a chipper 290 and a chip blower 292 for reducing slash to chips and conveying the chips through a pipe 294 to a remote chip van 296. In addition, two large rubber tires 298 serve as the traction means instead of the crawler-type tracks 16 and 116 of the previously described embodiments. The primary propulsion for climbing up slope is provided by a power winch 246 which reels in a cable 244 anchored to a stump 300 or other suitable uphill support. Like the previously described vehicles 10 and 110, the rubber-tired vehicle 210 has excellent maneuverability on steep slopes by virtue of synchronized traction drive and winch systems. Once the vehicle 210 is set up for operation on the slope 212, a knuckle boom 228, having a grapple 230, is used to gather and feed slash into a conveyor 302 leading into the chipper 290.

From the foregoing description, it will be appreciated that each of the embodiments of the invention enables slash gathering and removal from steep logging slopes with minimum damage to the forest mantle. This is accomplished by the unique system of underpowered traction means synchronized with a power winch which provides the primary propulsion. The traction means, whether they be crawler tracks or large tires, merely assist movement and steer the respective vehicles 10, 110 and 210 of the above-described illustrative embodiments of the invention. Speed and pressure compensated pumps in the hydrostatic drive systems of the traction means can be used to provide the desired synchronization, thereby minimizing spinout and slippage of the tracks 16, 116 or tires 298 and the consequent soil disturbance. Because the traction means on each of the above-described embodiments only assists the respective propulsion winch systems 46, 146 and 246, far less horsepower is required to drive the traction means than would otherwise be provided.

Although preferred embodiments of the invention have been described in detail, it is to be understood that various changes, substitutions and alterations can be made therein without departing from the spirit and scope of the invention as defined in the appended claims.

What is claimed is:

1. A vehicle for use with a cable anchored uphill on a logging slope comprising:

traction means supporting the vehicle for movement along the slope, a winch mounted rearwardly on the vehicle for reeling in the cable to pull the vehicle uphill with assistance from the traction means, a source of power carried on the vehicle for driving the traction means and the winch, an elongated boom disposed on the vehicle and having means at an end remote from the vehicle for gathering slash from the logging slope, and a tail boom adapted to guide the cable onto the winch, the tail boom being pivotable both laterally and longitudinally.

2. The vehicle of claim 1 further comprising a fairlead mounted on the end of the tail boom and means for laterally pivoting the fairlead to controllably spool cable onto the winch.

3. In a logging system including a cable anchored to an uphill point on a steep logging slope and a slash removal vehicle stationed on the slope below the uphill point, the vehicle including a knuckle boom for reaching to extended lengths for gathering slash, an articulating tail boom rearwardly mounted on the vehicle, and a fairlead disposed at the remote end of the tail boom, the cable passing through the fairlead to a point of attachment near the base of the tail boom, the method of stabilizing the vehicle during slash removal comprising tilting the tail boom to one side of the vehicle to permit the knuckle boom to reach outwardly from the same side without overturning the vehicle.

4. A vehicle for removing slash from a steep logging slope comprising:

right and left independent traction means supporting the vehicle for movement along the slope;

a tail boom rearwardly mounted on the vehicle and pivotable in relation to the vehicle in both lateral and longitudinal directions;

a fairlead disposed on the end of the tail boom;

a winch mounted near the base of the tail boom for reeling in and letting out a cable through the fairlead, the cable being anchored to an uphill point;

an operator's cabin carried by the traction means;

means for leveling the operator's cabin when the vehicle is stationed for slash removal; and a knuckle boom extendable from the vehicle to gather slash.

5. The vehicle of claim 4 wherein the knuckle boom includes a grapple at the remote end thereof.

* * * * *